(12) United States Patent
Kurth et al.

(10) Patent No.: US 7,909,179 B2
(45) Date of Patent: Mar. 22, 2011

(54) MODIFIED POLYAMIDE MATRICES AND METHODS FOR THEIR PREPARATION

(75) Inventors: Christopher J. Kurth, Chaska, MN (US); Isaac K. Iverson, Minnetonka, MN (US); Steven D. Kloos, Chanhassen, MN (US); Leonard T. Hodgins, Closter, NJ (US)

(73) Assignee: GE Osmonics, Inc., Minnetonka, MN (US)

( * ) Notice: Subject to any disclaimer, the term of this patent is extended or adjusted under 35 U.S.C. 154(b) by 1576 days.

(21) Appl. No.: 11/204,425

(22) Filed: Aug. 16, 2005

(65) Prior Publication Data

US 2007/0039873 A1 Feb. 22, 2007

(51) Int. Cl.
  B01D 29/00 (2006.01)
  B01D 39/00 (2006.01)
  B01D 39/14 (2006.01)
  B01D 71/06 (2006.01)
  B01D 67/00 (2006.01)
  B01D 44/04 (2006.01)

(52) U.S. Cl. .............. 210/500.38; 210/490; 210/500.27; 210/500.39; 210/500.28; 264/48

(58) Field of Classification Search .............. 210/500.38, 210/490, 650, 651, 652, 653, 500.27, 500.39, 210/500.28; 264/41, 48
See application file for complete search history.

(56) References Cited

U.S. PATENT DOCUMENTS

| | | | |
|---|---|---|---|
| 3,744,642 A | 7/1973 | Scala et al. | |
| 4,277,344 A | 7/1981 | Cadotte | |
| 4,302,336 A * | 11/1981 | Kawaguchi et al. | 210/654 |
| 4,676,959 A | 6/1987 | The et al. | |
| 4,678,477 A | 7/1987 | The et al. | |
| 4,761,234 A | 8/1988 | Uemura et al. | |
| 4,765,897 A | 8/1988 | Cadotte et al. | |
| 4,778,596 A | 10/1988 | Linder et al. | |
| 4,786,482 A | 11/1988 | The et al. | |
| 4,859,384 A | 8/1989 | Fibiger et al. | |
| 4,948,506 A * | 8/1990 | Lonsdale et al. | 210/490 |
| 4,950,404 A | 8/1990 | Chau | |
| 4,960,517 A | 10/1990 | Cadotte | |
| 4,983,291 A | 1/1991 | Chau et al. | |
| 5,527,524 A | 6/1996 | Tomalia et al. | |
| 5,582,725 A | 12/1996 | McCray et al. | |
| 5,627,217 A * | 5/1997 | Rilling et al. | 521/50 |
| 5,693,227 A | 12/1997 | Costa | |
| 6,204,231 B1 | 3/2001 | Patten et al. | |
| 6,454,958 B1 | 9/2002 | Loehr | |
| 6,565,747 B1 | 5/2003 | Shintani et al. | |
| 6,783,711 B2 | 8/2004 | Kurth et al. | |
| 6,837,996 B2 | 1/2005 | Kurth et al. | |
| 6,987,150 B2 | 1/2006 | Kurth et al. | |
| 7,138,058 B2 * | 11/2006 | Kurth et al. | 210/500.38 |
| 7,575,687 B2 * | 8/2009 | Kurth et al. | 210/651 |
| 2003/0121857 A1 | 7/2003 | Kurth et al. | |
| 2004/0052706 A1 | 3/2004 | Armstrong et al. | |

FOREIGN PATENT DOCUMENTS

| | | |
|---|---|---|
| EP | 1 020 218 A1 | 7/2000 |
| EP | 1 044 718 | 10/2000 |
| GB | 976 392 | 11/1964 |
| WO | WO 95/27681 | 10/1995 |
| WO | WO 01/89654 | 11/2001 |
| WO | WO 01/90223 | 11/2001 |
| WO | WO 01/91873 | 12/2001 |
| WO | WO 02/051753 | 7/2002 |
| WO | WO 2004/014805 | 2/2004 |

OTHER PUBLICATIONS

Armstrong et al., "A New Membrane Process to Purify Bayer Liquors", *Proceedings of the 6th International Alumina Quality Workshop*, 6 pgs., 2002.

Awadalla et al., "Separation of Humic Acids from Bayer Process Liquor by Membrane Filtration", *Separation Science and Technology*, 29(8). pp. 1011-1028, 1994.

Awadalla et al., "Opportunities for Membrane Technologies in the Treatment of Mining and Mineral Process Streams and Effluents", *Separation Science and Technology*, 29(10). pp. 1231-1249, 1994.

Clegg et al., "Development of Liquor Purification at Alcan Gove", *Proceedings of the 7th International Alumina Quality Workshop*, 12 pgs., 2005.

Database WPI Week 197539, Derwent Publications Ltd., London, GB, 1975-64595W.

Evers et al., "Poly-m-phenoxylene Sulfonamides", *Journal of Polymer Science*, Part A-1, vol. 5, pp. 935-940, 1967.

Gillespie, Bayer Liquid Purification by Nano-Filtration Membranes, *Proceedings of the 7th International Alumina Quality Workshop*, 10 pgs., 2005.

Marciano et al., "Nanofiltration of Bayer process solutions", *Journal of Membrane Science*, 281, pp. 260-267, 2006.

Poslyakova et al., "Chemical Resistance of Ultrafiltration Membranes", Plast Massy, No. 1, p. 20, 1995.

Trushinski et al., "Polysulfonamide thin-film composite reverse osmosis membranes", *Journal of Membrane Science*, 143, pp. 181-188, 1998.

SeIRO MPT-34-ph Stable Membrane, Koch Membrane Systems Product Description, 2 pgs., Jun. 2004 RO Spec. Sheet.

* cited by examiner

*Primary Examiner* — Ana M Fortuna

(74) *Attorney, Agent, or Firm* — Viksnins Harris & Padys PLLP

(57) ABSTRACT

The invention provides novel polymer matrices and methods for preparing polymer matrices.

5 Claims, 3 Drawing Sheets

Table 1

MODIFIED POLYAMIDE MATRICES AND METHODS FOR THEIR PREPARATION

BACKGROUND OF THE INVENTION

Semipermeable membranes play an important part in industrial processing technology and other commercial and consumer applications. Examples of their applications include, among others, biosensors, transport membranes, drug delivery systems, water purification systems, optical absorbers, and selective separation systems for aqueous and organic liquids carrying dissolved or suspended components.

Generally, semipermeable membranes operate in separation devices by allowing only certain components of a solution or dispersion to preferentially pass through the membrane. The fluid that is passed through the membrane is termed the permeate and comprises a solvent alone or in combination with one or more of the other agents in solution. The components that do not pass through the membrane are usually termed the retentate. The permeate and/or retentate may provide desired product.

Reverse osmosis (RO), nanofiltration (NF), ultrafiltration (UF), and microfiltration (MF) are examples of membrane processes. Microfiltration is a separation process that utilizes membranes having pores of sizes from about 0.1 microns to about 10 microns. Ultrafiltration is a separation process that utilizes membranes having defined pores of sizes of about 1 nm to about 0.1 microns. Ultrafiltration membranes are often characterized by their "molecular weight cut-off", a technique that defines the ability of ultrafiltration membranes to separate polymers from a solvent. A molecular weight cut-off method is described in ASTM method E1343-90(1997)e1: "Standard Test Method for Molecular Weight Cutoff Evaluation of Flat Sheet Ultrafiltration Membranes".

Nanofiltration is a process where a favorable portion of at least one small agent (typically less than 1000 MW or a salt) passes through the membrane with the solvent and a desirable amount of at least one other small agent (typically less than 1000 MW or a salt) is retained. An example of a nanofiltration process is the desalting of a sugar solution, where 80% of the salt passes the membrane with the water and 95% of the sugar is retained by the membrane. In this example, the sugar and salt can be fractionated. Because nanofiltration is a process, the definition of a nanofiltration membrane is a membrane commonly used in nanofiltration processes.

Reverse osmosis is a process where the large majority of each agent in solution is retained by the membrane while the solvent passes through the membrane, with the common provision that at least one of the agents being removed in solution is small (less than 1000 MW or a salt). Examples of reverse osmosis processes are the purification of seawater, where often less than 1% of the species in the seawater are found in the permeate. Because reverse osmosis is a process, the definition of a reverse osmosis membrane is a membrane commonly used in reverse osmosis processes.

It should be well understood that a membrane commonly termed a nanofiltration membrane can be capable of reverse osmosis and vice versa. For example, a common so-called nanofiltration membrane, Desal 5 DK, can retain greater than 99% of magnesium sulfate from water. In this case, because the large majority of the magnesium sulfate is retained and the permeate contains a low amount of this salt, the process is reverse osmosis. Therefore, this is an example of a reverse osmosis process using a "nanofiltration" membrane. Also, a common reverse osmosis membrane, Desal 3 SG, can pass hydrofluoric acid with water while retaining simple ions such as sodium, copper, and chloride. In this example, the membrane discriminates between the HF and the other small agents in solution, making it a nanofiltration process using a "reverse osmosis" membrane.

The performance of RO and NF membranes typically is characterized by two parameters: permeate flux and solute rejection. The flux parameter indicates the rate of permeate flow per unit area per unit pressure of membrane. The rejection indicates the ability of the membrane to retain certain components while passing others.

RO and NF membrane processes require a pressure or concentration gradient in order to perform the desired separation. When functioning to separate, the process using a reverse osmosis membrane overcomes the osmotic pressure resulting from the differential concentration of salts across the membrane. Pressure must be applied to the feed solution being separated in order to overcome this osmotic pressure and to cause a reasonable flux of permeate. RO and NF membranes typically exhibit high flow rates or fluxes at reasonable pressures. Currently, such membrane fluxes on the order of about $1*10^{-5}$ to $50*10^{-5}$ $cm^3/cm^2*sec*atm$.

The majority of RO and NF membranes are constructed as composite membranes having a thin barrier membrane formed as a coating or layer on top of a porous support material. Typically, this RO or NF membrane is formed by interfacial polymerization of a thin film on a porous support. For example, U.S. Pat. No. 3,744,642 to Scala discloses an interfacial membrane process for preparation of a reverse osmosis membrane. Additional U.S. patents disclosing polyamide and polysulfonamide membranes include U.S. Pat. Nos. 4,277,344; 4,761,234; 4,765,897; 4,950,404; 4,983,291; 5,658,460; 5,627,217; 5,693,227; 6,783,711; and 6,837,996.

Current interfacially prepared membranes substantially reach the goals of extreme thinness and substantial freedom from flaws or imperfections. The closer an RO or NF membrane comes to these two goals, the better is its flux and rejection values. These two features of minimal thickness and freedom from flaws, however, are not altogether compatible objectives. As the thickness of the polymeric film or membrane decreases, the probability increases significantly that holes or void spaces in the film structure will be formed. Of course, these holes or void spaces result in significant loss of solute rejection.

When processing conditions to form such thin and defect free membranes are found, it is often the case that changes to those conditions are detrimental to performance. As a result, much work on improved interfacial membranes has focused on ways to alter the membrane without changing the process used to initially form the membrane. One common means of affecting the character of a membrane is through the use of post treatments. Post treatments leading to improved permeability, improved rejection, and improved resistance to fouling have been disclosed previously.

Post treatments meant to improve rejection have involved reactions with amine reactive molecules. U.S. Pat. No. 4,960,517 teaches the use of amine reactive species which reduce the passage of sulfuric acid and U.S. Pat. No. 5,582,725 teaches the use of a post treatment with acyl halides after the membrane has been swollen and then redried.

What is needed are new post treatment methods that can be chosen independent of the film forming reactants and can be used to selectively alter the thin film. This would enable freedom to tailor the post treatment chemistry to improve rejection or fouling characteristics of the membrane while retaining the same reactants and process conditions used to initially form the membrane. These post treatment methods should utilize reagents that are quite reactive with residual amine groups to allow rapid modification, but not highly reactive with the solvent used in the modification, for example alcohols. Such post treatments would allow a single manufacturing process to produce multiple products by alteration of the functionality present on the post treatment molecule.

SUMMARY OF THE INVENTION

Applicant has discovered a post treatment method that is independent of the film forming reactants and that can be can be used to selectively alter the properties of a thin film. This method allows a single manufacturing process to produce multiple products by alteration of the amine functionality present on an insoluble branched condensation polymer matrix.

In one embodiment the invention provides a modified insoluble branched condensation polymer matrix comprising, 1) an insoluble branched condensation polymer matrix comprising reactant residues, and 2) a plurality of aryl residues that differ from said reactant residues and that are terminally-linked to the insoluble branched condensation polymer matrix through sulfonamide bonds.

In another embodiment the invention provides a modified insoluble branched condensation polymer matrix comprising 1) an insoluble branched polyamide matrix, and 2) a plurality of aryl residues that are terminally-linked to the insoluble branched polyamide matrix through sulfonamide bonds.

In another embodiment the invention provides a modified insoluble branched condensation polymer matrix that comprises, 1) an insoluble branched condensation polymer matrix, and 2) a plurality of aryl residues of the formula Ar—SO$_2$—, wherein each Ar is, 1) a 6-20 carbon monocyclic, bicyclic, or polycyclic ring system in which at least one ring is aromatic, which ring system is optionally be substituted with one or more substituents independently selected from cyano, halo, hydroxy, mercapto, nitro, carboxy, ($C_1$-$C_{20}$)alkyl, ($C_1$-$C_{20}$)alkoxy, ($C_1$-$C_{20}$)alkoxycarbonyl, ($C_1$-$C_{20}$)alkanoyloxy, phenyl, or —NR$_a$R$_b$, wherein R$_a$ and R$_b$ may be the same or different and are chosen from hydrogen ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy, or wherein R$_a$ and R$_b$ together with the nitrogen to which they are attached form a pyrrolidino, piperidino, morpholino, or thiomorpholino ring; wherein each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy is optionally substituted with one or more cyano, halo, hydroxy, mercapto, nitro, carboxy, sulfo, oxo (═O), thioxo (═S) or —NR$_a$R$_b$ and wherein one or more carbons of each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy can optionally be replaced with —O—, —S—, or —NR$_c$—, wherein each R$_c$ is independently hydrogen, ($C_1$-$C_6$)alkyl, ($C_1$-$C_6$)alkoxy, ($C_1$-$C_6$)alkoxycarbonyl, and ($C_1$-$C_6$)alkanoyloxy; or 2) a 1-20 carbon monocyclic, bicyclic, or polycyclic ring system in which at least one heteroatom (i.e. non-carbon atom) containing ring is aromatic, which ring system can optionally be substituted with one or more substituents independently selected from cyano, halo, hydroxy, mercapto, nitro, carboxy, ($C_1$-$C_{20}$)alkyl, ($C_1$-$C_{20}$)alkoxy, ($C_1$-$C_{20}$)alkoxycarbonyl, ($C_1$-$C_{20}$)alkanoyloxy, or —NR$_a$R$_b$, wherein R$_a$ and R$_b$ may be the same or different and are chosen from hydrogen ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy, or wherein R$_a$ and R$_b$ together with the nitrogen to which they are attached form a pyrrolidino, piperidino, morpholino, or thiomorpholino ring; wherein each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy is optionally substituted with one or more cyano, halo, hydroxy, mercapto, nitro, carboxy, sulfo, oxo (═O), thioxo (═S) or —NR$_a$R$_b$ and wherein one or more carbons of each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy can optionally be replaced with —O—, —S—, or —NR$_c$—, wherein each R$_c$ is independently hydrogen, ($C_1$-$C_6$)alkyl, ($C_1$-$C_6$)alkoxy, ($C_1$-$C_6$)alkoxycarbonyl, and ($C_1$-$C_6$)alkanoyloxy;

In another embodiment the invention provides a method for preparing a modified insoluble branched condensation polymer matrix comprising, treating an insoluble branched condensation polymer matrix comprising reactant residues and having a plurality of primary or secondary amine groups, with a compound of the formula Ar—SO$_2$—X, wherein each X is a leaving group, each Ar is an aryl group or a heteroaryl group, and the reactant residues are not Ar—SO$_2$—, to provide the modified insoluble branched condensation polymer matrix.

In another embodiment the invention provides a method for preparing a modified insoluble branched condensation polymer matrix comprising treating an insoluble branched polyamide matrix having a plurality of primary or secondary amine groups with a compound of the formula Ar—SO$_2$—X, wherein each X is a leaving group, and each Ar is an aryl group or a heteroaryl group, to provide the modified insoluble branched condensation polymer matrix.

In another embodiment the invention provides a method for preparing a modified insoluble branched condensation polymer matrix comprising treating an insoluble branched condensation polymer matrix having a plurality of primary or secondary amine groups, with a compound of the formula Ar—SO$_2$—X, wherein each X is a leaving group, and each Ar is 1) a 6-20 carbon monocyclic, bicyclic, or polycyclic ring system in which at least one ring is aromatic, which ring system is optionally be substituted with one or more substituents independently selected from cyano, halo, hydroxy, mercapto, nitro, carboxy, ($C_1$-$C_{20}$)alkyl, ($C_1$-$C_{20}$)alkoxy, ($C_1$-$C_{20}$)alkoxycarbonyl, ($C_1$-$C_{20}$)alkanoyloxy, phenyl, or —NR$_a$R$_b$, wherein R$_a$ and R$_b$ may be the same or different and are chosen from hydrogen ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy, or wherein R$_a$ and R$_b$ together with the nitrogen to which they are attached form a pyrrolidino, piperidino, morpholino, or thiomorpholino ring; wherein each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy is optionally substituted with one or more cyano, halo, hydroxy, mercapto, nitro, carboxy, sulfo, oxo (═O), thioxo (═S) or —NR$_a$R$_b$ and wherein one or more carbons of each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy can optionally be replaced with —O—, —S—, or —NR$_c$—, wherein each R$_c$ is independently hydrogen, ($C_1$-$C_6$)alkyl, ($C_1$-$C_6$)alkoxy, ($C_1$-$C_6$)alkoxycarbonyl, and ($C_1$-$C_6$)alkanoyloxy; or 2) a 1-20 carbon monocyclic, bicyclic, or polycyclic ring system in which at least one heteroatom (i.e. non-carbon atom) containing ring is aromatic, which ring system can optionally be substituted with one or more substituents independently selected from cyano, halo, hydroxy, mercapto, nitro, carboxy, ($C_1$-$C_{20}$)alkyl, ($C_1$-$C_{20}$)alkoxy, ($C_1$-$C_{20}$)alkoxycarbonyl, ($C_1$-$C_{20}$)alkanoyloxy, or —NR$_a$R$_b$, wherein R$_a$ and R$_b$ may be the same or different and are chosen from hydrogen ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy, or wherein R$_a$ and R$_b$ together with the nitrogen to which they are attached form a pyrrolidino, piperidino, morpholino, or thiomorpholino ring; wherein each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy is optionally substituted with one or more cyano, halo, hydroxy, mercapto, nitro, carboxy, sulfo, oxo (=O), thioxo (=S) or —$NR_aR_b$ and wherein one or more carbons of each ($C_1$-$C_{20}$) alkyl, ($C_1$-$C_{20}$)alkoxy, ($C_1$-$C_{20}$)alkoxycarbonyl, and ($C_1$-$C_{20}$)alkanoyloxy can optionally be replaced with —O—, —S—, or —$N_c$—, wherein each $R_c$ is independently hydrogen, ($C_1$-$C_6$)alkyl, ($C_1$-$C_6$)alkoxy, ($C_1$-$C_6$)alkoxycarbonyl, and ($C_1$-$C_6$)alkanoyloxy; to provide the modified insoluble branched condensation polymer matrix.

In another embodiment the invention provides a matrix prepared according to a method of the invention.

DETAILED DESCRIPTION OF THE INVENTION

Definitions

Figure 1:
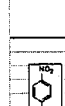
FIG. 1 depicts salt water testing values for membranes prepared according to examples 1 and 2 vs. the untreated control membrane for various aryl sulfonyl chlorides dissolved in MeOH.

As used herein, a "residue" is the portion of a reactant that remains as part of a matrix after it has reacted and consists of atoms present in the reactant prior to reaction. Additional atoms may have left during reaction, and other transformations such as a ring opening may have occurred, which lead to differences in structure between residues and reactants. For example, an aryl sulfonyl chloride reacted with an amine group of a matrix would form a sulfonamide linked aryl residue; the "residue" consists of the aryl ring, any groups substituted on the aryl ring, and the sulfur dioxide moiety; the nitrogen would not be part of the residue, as it was part of the precursor matrix, not of the reactant. If in this example the aryl sulfonyl chloride reactant was p-toluenesulfonyl chloride, the residue would be p-$CH_3$—$C_6H_4$—$SO_2$—.

As used herein, an "insoluble branched condensation polymer matrix" is a polymer that posses at least some residues that have greater than two sites where monomers have added, leading to a branch point in the polymer chain. The residues bound to the branch points may be short and consist of only 1 additional residue, or may be of large molecular weight and contain hundreds or even thousands of additional residues. The residues may also connect with another branch point and form a crosslink. The branch points may fall primarily along a main polymer giving a comb like structure, or there may be a series of branches on other branches giving a dendritic structure.

As used herein, an "insoluble" matrix is a matrix that is incapable of forming a one phase liquid solution with a suitable solvent, without first breaking chemical bonds within the matrix itself. Insoluble matrices typically result from crosslinking, crystallinity, or other phenomena.

Condensation polymers typically comprise repeating functional groups, such as esters, amides, sulfonamides, urethanes, sulfides, sulfones, ethers, or other olefinic groups, within their polymeric backbone. They are often prepared from reactants that lose atoms during the formation of the polymer, resulting in a polymer that comprises residues of the reactants. For example, a condensation polymer can be formed by reacting a polysulfonyl halide reactant with a polyamine reactant to provide a polysulfonamide condensation polymer; during the polymer forming condensation reaction, HCl is lost from the reactants.

As used herein, the term "matrix" means a regular, irregular and/or random arrangement of polymer molecules such that on a macromolecular scale the arrangements of molecules may show repeating patterns, or may show series of patterns that sometimes repeat and sometimes display irregularities, or may show no pattern respectively. The molecules may or may not be cross-linked. On a scale such as would be obtained from SEM, X-Ray or FTNMR, the molecular arrangement may show a physical configuration in three dimensions like those of networks, meshes, arrays, frameworks, scaffoldings, three dimensional nets or three dimensional entanglements of molecules. The matrix may be non-self supporting. Preferably, the matrix is in the form of a thin film with an average thickness from about 5 nm to about 10000 nm, and more preferably about 5 to about 400 nm. In usual practice, the matrix is grossly configured as an ultrathin film or sheet.

As used herein, the term "membrane" means a semipermeable material which can be used to separate components of a feed fluid into a permeate that passes through the membrane and a retentate that is rejected or retained by the membrane.

As used herein, the term "composite membrane" means a matrix layered or coated on at least one side of a support material.

As used herein, the term "support material" means any substrate upon which the matrix can be formed or applied. Included are semipermeable membranes especially of the micro-and ultrafiltration kind, fabric, filtration materials as well as others. The substrate may be porous, microporous or non-porous.

As used herein, the term "terminally linked" means that the group is covalently bonded to the polymer matrix at only one point, and the linkage is through a sulfonamide group.

As used herein, the term "aryl residue" is a residue as defined herein, that includes an aryl group or a heteroaryl group.

As used herein, the term "aryl group" includes a 6-20 carbon monocyclic, bicyclic, or polycyclic ring system in which at least one ring is aromatic. An aryl group can optionally be substituted with one or more substituents independently selected from cyano, halo, hydroxy, mercapto, nitro, carboxy, sulfo, ($C_1$-$C_{20}$)alkyl, ($C_1$-$C_{20}$)alkoxy, ($C_1$-$C_{20}$)alkoxycarbonyl, ($C_1$-$C_{20}$)alkanoyloxy, phenyl, or —$NR_aR_b$, wherein $R_a$ and $R_b$ may be the same or different and are chosen from hydrogen ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy, or wherein $R_a$ and $R_b$ together with the nitrogen to which they are attached form a pyrrolidino, piperidino, morpholino, or thiomorpholino ring; wherein each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy is optionally substituted with one or more cyano, halo, hydroxy, mercapto, nitro, carboxy, sulfo, oxo (=O), thioxo (=S) or —$NR_aR_b$ and wherein one or more carbons of each ($C_1$-$C_{20}$) alkyl, ($C_1$-$C_{20}$)alkoxy, ($C_1$-$C_{20}$)alkoxycarbonyl, and ($C_1$-$C_{20}$)alkanoyloxy can optionally be replaced with —O—, —S—, or —$NR_c$—, wherein each $R_c$ is independently hydrogen, ($C_1$-$C_6$)alkyl, ($C_1$-$C_6$)alkoxy, ($C_1$-$C_6$)alkoxycarbonyl, and ($C_1$-$C_6$)alkanoyloxy. Examples of 6-20 carbon monocyclic, bicyclic, or polycyclic ring systems in which at least one ring is aromatic include phenyl, naphthyl, indol, anthrocenyl, phenanthryl, perylene, pyrenyl, tetrahydronaphthyl benzopyrene, and azulene.

As used herein, the term "heteroaryl group" is a 1-20 carbon monocyclic, bicyclic, or polycyclic ring system in which at least one heteroatom (i.e. non-carbon atom) containing ring is aromatic. A heteroaryl group can optionally be substituted with one or more substituents independently selected from cyano, halo, hydroxy, mercapto, nitro, carboxy, sulfo, $(C_1-C_{20})$alkyl, $(C_1-C_{20})$alkoxy, $(C_1-C_{20})$alkoxycarbonyl, $(C_1-C_{20})$alkanoyloxy, or —$NR_aR_b$, wherein $R_a$ and $R_b$ may be the same or different and are chosen from hydrogen $(C_1-C_{20})$alkyl, $(C_1-C_{20})$alkoxy, $(C_1-C_{20})$alkoxycarbonyl, and $(C_1-C_{20})$alkanoyloxy, or wherein $R_a$ and $R_b$ together with the nitrogen to which they are attached form a pyrrolidino, piperidino, morpholino, or thiomorpholino ring; wherein each $(C_1-C_{20})$alkyl, $(C_1-C_{20})$alkoxy, $(C_1-C_{20})$alkoxycarbonyl, and $(C_1-C_{20})$alkanoyloxy is optionally substituted with one or more cyano, halo, hydroxy, mercapto, nitro, carboxy, sulfo, oxo (=O), thioxo (=S) or —$NR_aR_b$ and wherein one or more carbons of each $(C_1-C_{20})$alkyl, $(C_1-C_{20})$alkoxy, $(C_1-C_{20})$alkoxycarbonyl, and $(C_1-C_{20})$alkanoyloxy can optionally be replaced with —O—, —S—, or —$NR_c$—, wherein each $R_c$ is independently hydrogen, $(C_1-C_6)$alkyl, $(C_1-C_6)$alkoxy, $(C_1-C_6)$alkoxycarbonyl, and $(C_1-C_6)$alkanoyloxy. Examples of 1-20 carbon monocyclic, bicyclic, or polycyclic ring system in which at least one heteroatom (i.e. non-carbon atom) containing ring is aromatic include pyridyl, thienyl, furyl, pyrrole, thiophene, pyrimidine, imidazole, indole, isoindole, purine, quinoline, isoquinoline, acridine, benzothiophene, benzofuran, benzimidazole, oxazole, and thiazole.

The "leaving group" X can be any group which is suitable to allow the reagent Ar—$SO_2$—X to react with a primary or secondary amine to provide a sulfonamide bond. Suitable leaving groups are known, for example, see U.S. Pat. No. 4,778,596. Examples of suitable leaving groups include halogens (e.g. fluoro, chloro or bromo), sulfonates, pyridine salts, and dimethylamino pyridine complexes.

Materials of the Invention

As discussed above, there is a need for post treatment methods that can be chosen independent of the film forming reactants and that can be used to selectively alter a thin film. Such post treatments methods would allow a single manufacturing process to produce multiple products by alteration of the amine functionality present on an insoluble branched condensation polymer matrix.

The post-treatment methods of the invention allow for the preparation of a modified insoluble branched condensation polymer matrix comprising, 1) an insoluble branched condensation polymer matrix comprising reactant residues, and 2) a plurality of aryl residues that differ from said reactant residues and that are terminally-linked to the insoluble branched condensation polymer matrix through sulfonamide bonds. It is to be understood that according to the invention, post treatment with a multi-functional aryl sulfonyl reagent may result in some cross-linking, so that some of the aryl sulfonyl residues from the post-treatment may not be terminally-linked as defined hereinabove. Accordingly, in one specific embodiment of the invention, less than 10 weight percent of the modified insoluble branched condensation polymer matrix is post-treatment residues that are not terminally-linked. In another specific embodiment of the invention, less than 5 weight percent of the modified insoluble branched condensation polymer matrix is post-treatment residues that are not terminally-linked. In another specific embodiment of the invention, less than 1 weight percent of the modified insoluble branched condensation polymer matrix is post-treatment residues that are not terminally-linked.

In one specific embodiment of the invention, the modified matrix materials of the invention can be incorporated into beads, sheets, or films.

Methods of the Invention

The invention provides a method for preparing a modified insoluble branched condensation polymer matrix comprising, treating an insoluble branched condensation polymer matrix comprising reactant residues and having a plurality of primary or secondary amine groups, with a compound of the formula Ar—$SO_2$—X, wherein each X is a leaving group and each Ar is an aryl group or a heteroaryl group. According to the methods of the invention, the reactant residues in the starting matrix differ from Ar—$SO_2$—. Thus, following post-treatment using a method of the invention, the resulting modified matrix is capped with aryl sulfonyl groups that differ from the residues within the starting matrix. Accordingly, the methods of the invention allow for the preparation of novel matrix materials having unique caps that impart specific properties to the matrix. By modifying the composition of the capping groups, the properties of the matrix can be tuned for a specific application.

In one specific embodiment, the starting matrix can be treated with base to facilitate the sulfonamide forming reaction.

In another specific embodiment, the sulfonamide forming reaction can be carried out in a lower alcohol (e.g. methanol).

The invention will now be illustrated by the following non-limiting Examples.

EXAMPLES

Example 1

Representative Post-treatment Procedure for Polyamide Membrane

Dry flat-sheet composite polyamide reverse osmosis membrane (FT30 from FilmTec) was clipped between two 8"×11" plastic frames. DI water was poured onto the face at a depth of a ¼" and allowed to soak for 20 minutes. A 1% (w/w) solution of the aryl sulfonyl chloride (see table) was freshly made in MeOH with 0.2% (w/w) triethyl amine. The water was removed from the face of the membrane by simply draining for a few seconds. The MeOH solution containing the aryl sulfonyl chloride was poured on the face of the membrane to a depth of ⅛" and allowed to be in contact with the membrane for 2 minutes. The methanol solution was poured off and then the membrane face and back side were rinsed with excess water. The membrane was kept wet until testing.

Example 2

Representative Post-treatment Procedure for Polysulfonamide Membrane

A hand frame of the base polysulfonamide membrane was made as follows: A commercially available PES diary UF membrane was clipped between two 8"×11" plastic frames and the membrane face with rinsed with excess water to remove residual chemicals. The water was drained off. A 2% (w/w) piperazine aqueous solution also containing 2% TEA and 4% camphor sulfonic acid and 0.1% (w/w) 4-(N,N-dimethylamino)-pyridine was added to the face side of the frame so that the depth of solution was ⅛". It was allowed to stay in contact for 1 minute. The aqueous amine solution was poured off and allowed to drain for a few seconds. Excess droplets of the amine solution were metered off the surface of the membrane by running the membrane face under an air knife. The amine laden membrane was immediately laid flat and 200 mL of 0.16% (w/w) 1,3,6-naphthalene trisulfonyl chloride in 20:80 mesitylene:Isopar G solution which had been preheated to 90° C. was carefully poured onto the corner of the frame surface. The solution was allowed to stay in contact with the frame for 2 minutes and then drained off with the temperature of the drained liquid about 45° C. After draining the organic phase, the frame was placed in a convection oven at a 45° angle face up for 8 minutes at 100° C. After removing the membrane from the oven and allowing to cool to RT, the membrane was wet out with DI water for 20 minutes as Example 1. After removing the water, a 1% (w/w) NaOH aqueous solution was poured on the face of the membrane for 1 minute and drained. A brief rinse of the membrane surface with about 10 mL of water was performed. The wet membrane was laid face up and immediately the MeOH solution constituted as Example 1 was poured on. The dwell time and rinsing were identical to those in Example 1. The membrane was kept wet until testing.

Table 1, in FIG. 1 shows salt water testing values for membranes prepared according to examples 1 and 2 vs. the untreated control membrane for various aryl sulfonyl chlorides dissolved in MeOH. All data collected at 225 psig, pH 7 to 7.5, 2000 ppm NaCl in DI water, 75° F., 1 gpm cross-flow in cross-flow cells with 35 cm² membrane area. Permeability data in units of A value ($10^{-5}$ cm/atm*s). Salt transmission data (% Passage) measured as conductivity of permeate over feed.

Example 3

A commercial flat-sheet composite polyamide reverse osmosis membrane (FT30 from FilmTec) was post-treated as Example 1 with the exception that 3% (w/w) p-nitro-benzenesulfonyl chloride was used in the MeOH solution. The membrane was then tested under standard brackish NaCl aqueous solutions and high salinity 3.5% NaCl simulated seawater solution. (Table 2) After testing on 0.20%, 3.5%, and 0.20% NaCl aqueous solutions sequentially the membrane and its untreated control were chlorinated while running in the test cells with 70 ppm NaOCl at pH 8.5, 77° F. for 30 minutes. The NaOCl was removed and the treated membrane and its untreated control were tested on 0.20% and 3.5% NaCl sequentially again (Table 2). Pressures and temperatures are given and the units of permeability and salt transmission are as Table 1.

TABLE 2

| experiment order | NaCl concentration (%) | A value | NaCl Passage (%) | Temperature (deg C.) | Pressure (PSIG) |
|---|---|---|---|---|---|
| Post-treatment according to Example 3 | | | | | |
| 1 | 0.2 | 5 | 0.27 | 25 | 227 |
| 2 | 3.5 | 2.5 | 0.25 | 24 | 804 |
| 3 | 0.2 | 3.6 | 0.2 | 25 | 228 |
| 4 | | Chlorination in Cells | | | |
| 5 | 0.2 | 3.3 | 0.11 | 25 | 226 |
| 6 | 3.5 | 2.3 | 0.22 | 26 | 796 |
| Control to Example 3 | | | | | |
| 1 | 0.2 | 11.1 | 1.41 | 25 | 227 |
| 2 | 3.5 | 4.7 | 1.4 | 24 | 804 |
| 3 | 0.2 | 7.8 | 1.52 | 26 | 225 |
| 4 | | Chlorination in Cells | | | |
| 5 | 0.2 | 7.1 | 0.36 | 25 | 226 |
| 6 | 3.5 | 4.2 | 1.05 | 26 | 796 |

Example 4

Commercial flat-sheet composite polyamide reverse osmosis membrane (FT30 from FilmTec) was post-treated as Example 1 with the exception that the methanol solution also contained 4% (w/w) ethylene glycol dimethyl ether and only contained 0.1% triethyl amine. Various aryl sulfonyl chlorides were used including di and trisulfonyl chlorides. The membranes were tested at standard brackish RO conditions (2000 ppm NaCl in DI water, pH 7, 225 psig, 75° F., 1 gpm cross-flow) and data is shown in Table 3.

TABLE 3

| Testing sequence | Membrane | Aryl sulfonyl chloride | A value | % Pass |
|---|---|---|---|---|
| 1 | Example 4 | m-benzene disulonyl chloride | 7.6 | 0.61 |
| 1 | | p-nitrobenzenesulfonyl chloride | 5.6 | 0.47 |
| 1 | | 1,3,5-benzene trisulfonyl chloride | 9.8 | 0.50 |
| 1 | Control to Example 4 | untreated AG-F | 8.9 | 2.62 |
| 2 | | Chlorination as per Example 3 | | |
| 3 | Example 4 | m-benzene disulonyl chloride | 7.8 | 0.28 |
| 3 | | p-nitrobenzenesulfonyl chloride | 5.5 | 0.21 |
| 3 | | 1,3,5-benzene trisulfonyl chloride | 10.1 | 0.32 |
| 3 | Control to Example 4 | untreated AG-F | 9.1 | 0.45 |

Example 5

Figure 2:
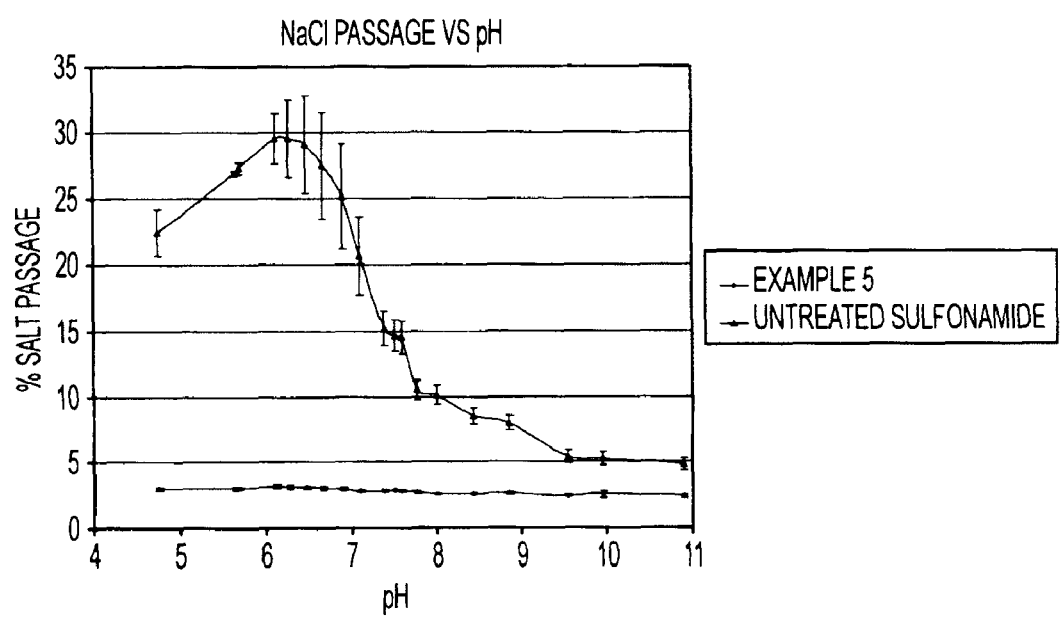
FIG. 2 depicts NaCL passages vs. pH.

A polysulfonamide membrane was made and post-treated as Example 2 except that m-benzenedisulfonyl chloride was used instead of the aryl monosulfonyl chlorides listed in Table 1. The membrane was tested with NaCl and $Na_2SO_4$ in water and data is shown in Table 4. Also this membrane was tested with 2000 ppm NaCl at various pH values along side an untreated polysulfonamide control membrane made as per Example 2. The plot of % rejection for the treated and untreated vs. pH is shown in FIG. 2.

TABLE 4

| | best coupon | |
|---|---|---|
| | A value | % Passage |
| 2000 ppm NaCl | 5.4 | 0.85% |
| 900 ppm NaCl | 6.0 | 0.62% |
| 2000 ppm Na2SO4 | 5.9 | 0.18% |
| 302-9 data | | |
| 225 psig | | |

Example 6

Figure 3:
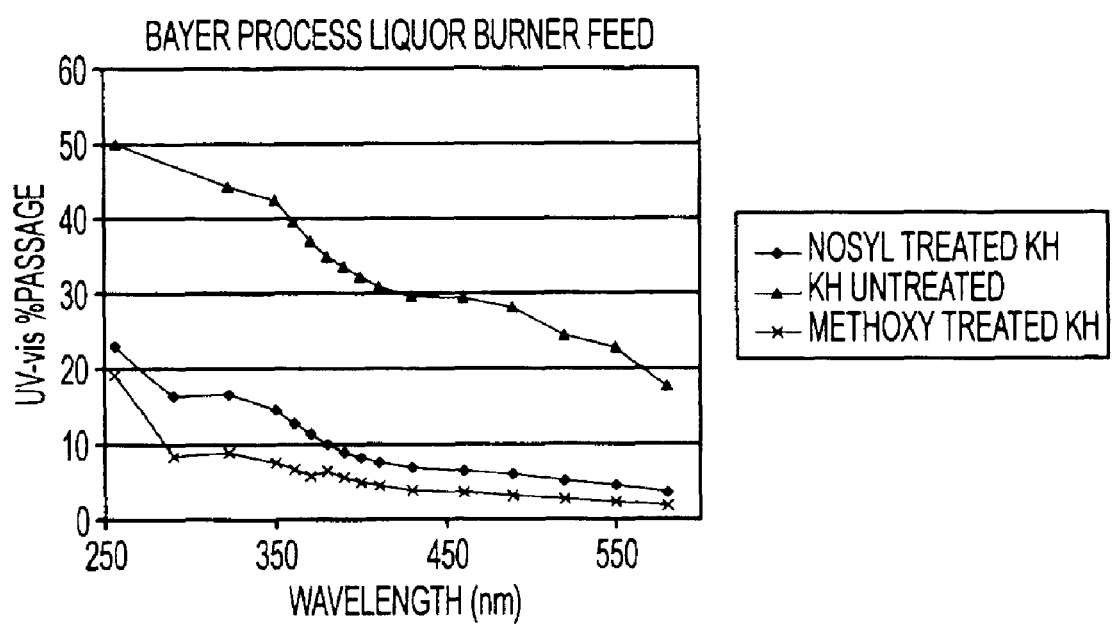
FIG. 3 depicts the ratio of Absorbance of permeate divided by feed plotted at various wavelengths.

A commercially available polysulfonamide KH membrane (from GE Water & Process Technologies) was treated as the oven dried membrane in Example 2. The aryl sulfonyl chlorides used were p-nitrobenzenesulfonyl chloride and p-methoxybenzene-sulfonyl chloride. The membrane was tested on a high caustic Bayer process liquor in stirred cells with 600 psig pneumatic pressure at RT. The resulting permeate was examined with UV-vis absorbance and decreases in the ABS was interpreted evidence of removing humic degradation organic compounds. The ratio of Absorbance of permeate divided by feed plotted at various wavelengths is shown in FIG. 3.

We claim:

1. A membrane having improved rejection characteristics comprising a modified insoluble branched condensation polymer matrix comprising 1) an insoluble branched condensation polymer matrix comprising reactant residues, and 2) a plurality of aryl residues that differ from said reactant residues and that are terminally-linked to amine groups on the insoluble branched condensation polymer matrix through sulfonamide bonds.

2. The membrane of claim 1 wherein the aryl residues that are terminally-linked are substituted with one or more substituents independently selected from cyano, halo, hydroxy, mercapto, nitro, trifluoromethyl, trifluoromethoxy, $(C_1-C_6)$ alkyl, $(C_1-C_6)$alkoxycarbonyl, $(C_1-C_6)$alkanoyloxy, or —$NR_aR_b$, wherein $R_a$ and $R_b$ may be the same or different and are chosen from hydrogen and $(C_1-C_6)$alkyl.

3. The membrane of claim 2 which is a composite membrane.

4. The composite membrane of claim 3 which is an RO or an NF membrane.

5. The membrane of claim 1 wherein the aryl residues have the formula Ar—$SO_2$—, wherein each Ar is, 1) a 6-20 carbon monocyclic, bicyclic, or polycyclic ring system in which at least one ring is aromatic, which ring system is optionally substituted with one or more substituents independently selected from cyano, halo, hydroxy, mercapto, nitro, carboxy, $(C_1-C_{20})$alkyl, $(C_1-C_{20})$alkoxy, $(C_1-C_{20})$alkoxycarbonyl, $(C_1-C_{20})$alkanoyloxy, phenyl, or —$NR_aR_b$, wherein $R_a$ and $R_b$ may be the same or different and are chosen from hydrogen, $(C_1-C_{20})$alkyl, $(C_1-C_{20})$alkoxy, $(C_1-C_{20})$alkoxycarbonyl, and $(C_1-C_{20})$alkanoyloxy, or wherein $R_a$ and $R_b$ together with the nitrogen to which they are attached form a pyrrolidino, piperidino, morpholino, or thiomorpholino ring; or 2) a 1-20 carbon monocyclic, bicyclic, or polycyclic ring system in which at least one heteroatom containing ring is aromatic, which ring system can optionally be substituted with one or more substituents independently selected from cyano, halo, hydroxy, mercapto, nitro, carboxy, $(C_1-C_{20})$alkyl, $(C_1-C_{20})$alkoxy, $(C_1-C_{20})$alkoxycarbonyl, $(C_1-C_{20})$alkanoyloxy, or —$NR_aR_b$, wherein $R_a$ and $R_b$ may be the same or different and are chosen from hydrogen $(C_1-C_{20})$alkyl, $(C_1-C_{20})$alkoxy, $(C_1-C_{20})$alkoxycarbonyl, and $(C_1-C_{20})$alkanoyloxy, or wherein $R_a$ and $R_b$ together with the nitrogen to which they are attached form a pyrrolidino, piperidino, morpholino, or thiomorpholino ring.

* * * * *